No. 652,804. Patented July 3, 1900.
J. D. V. McWILLIAMS.
ELEVATING OR LOWERING DEVICE FOR HARVESTER PLATFORMS.
(Application filed Feb. 23, 1900.)

(No Model.) 3 Sheets—Sheet 2.

WITNESSES:
K. M. Imboden,
F. A. Spencer.

INVENTOR,
Jas. D. V. McWilliams.
BY HIS ATTORNEYS,
Higdon & Higdon.

No. 652,804. Patented July 3, 1900.
J. D. V. McWILLIAMS.
ELEVATING OR LOWERING DEVICE FOR HARVESTER PLATFORMS.
(Application filed Feb. 23, 1900.)
(No Model.) 3 Sheets—Sheet 3.

WITNESSES:
INVENTOR,
Jas. D. V. McWilliams.
BY HIS ATTORNEYS,

UNITED STATES PATENT OFFICE.

JAMES DUDLEY VANHOOK McWILLIAMS, OF ALERT, OKLAHOMA TERRITORY.

ELEVATING OR LOWERING DEVICE FOR HARVESTER-PLATFORMS.

SPECIFICATION forming part of Letters Patent No. 652,804, dated July 3, 1900.

Application filed February 23, 1900. Serial No. 6,240. (No model.)

*To all whom it may concern:*

Be it known that I, JAMES DUDLEY VANHOOK McWILLIAMS, a citizen of the United States, and a resident of Alert, in the county of Kay and Territory of Oklahoma, have invented certain new and useful Improvements in Elevating or Lowering Devices for Harvester-Platforms, of which the following is a specification.

My invention relates to improvements in harvesters, especially of the type known as "headers and binders," and aims to provide new and improved means for elevating and lowering the platform carried by such machines, the particular object of my device being to so adjust the platform that whether in elevated or lowered position it shall preserve the same degree of inclination with reference to the grain to be cut. It is found in practice that when the crop is standing up properly in normal position the best results are obtained by keeping the platform always level whether it is in elevated or lowered position. When the grain is tangled or fallen down, so as to need lifting, the platform should be tilted forward and downward, and when cutting Kafir-corn or sorghum the inclination should be forward and upward to make the cut of the sickle easier. The machines in common use provide for the elevation and lowering of the platform; but such movements are accompanied by and involve a change in the inclination of the platform, which is not desirable. With my improvements the adjustment of the device having once been made with reference to the character of the work to be done the inclination of the platform remains constant whether in high or low position.

In the following description the side of the machine which is on the right or left as seen from the driver's stand at the rear of the machine will be considered the right or left hand side for the purposes of the description.

Figure 1:
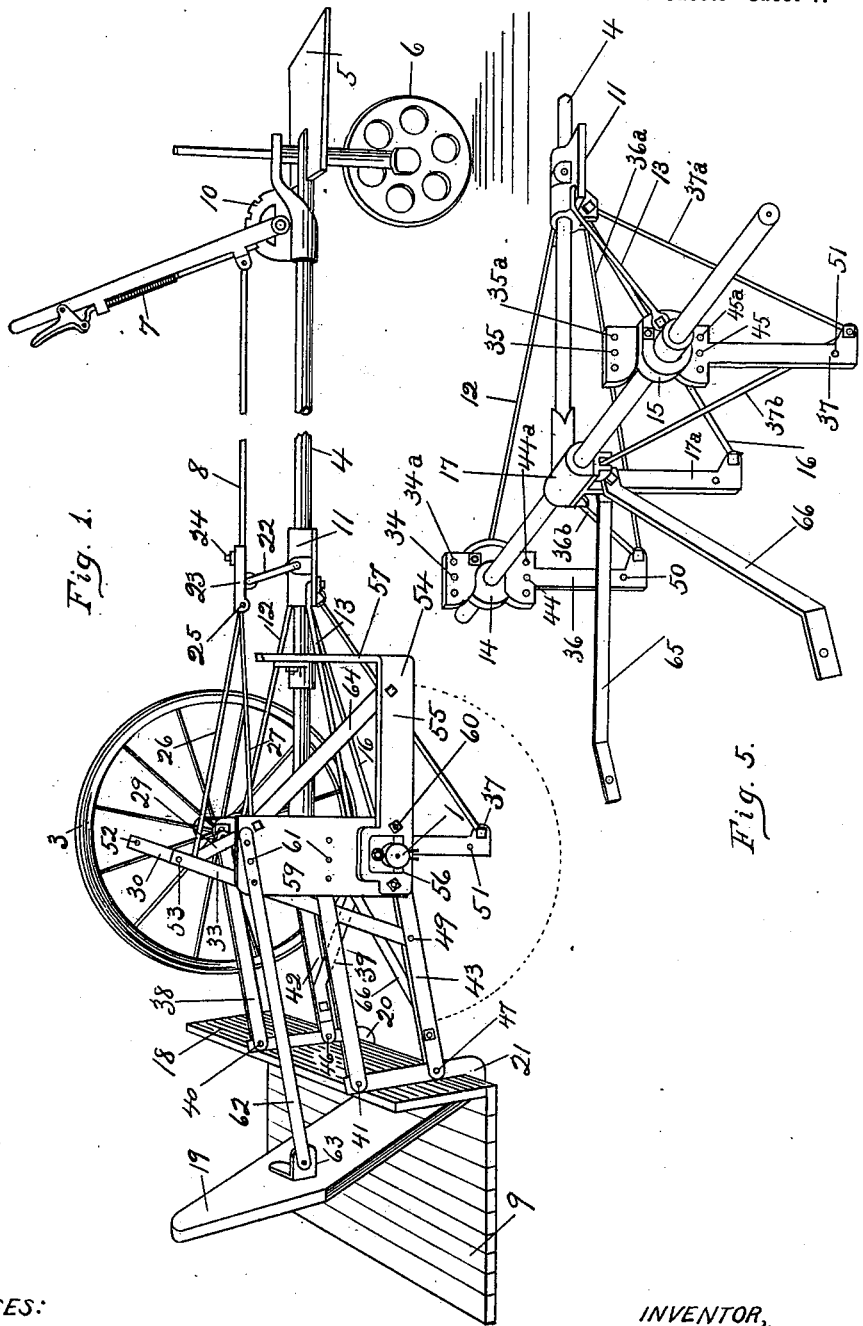
Figure 2:
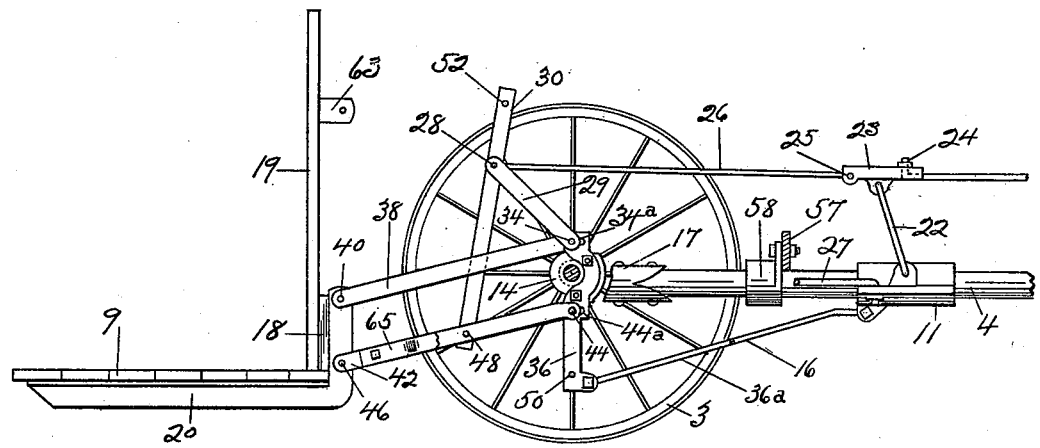
Figure 3:
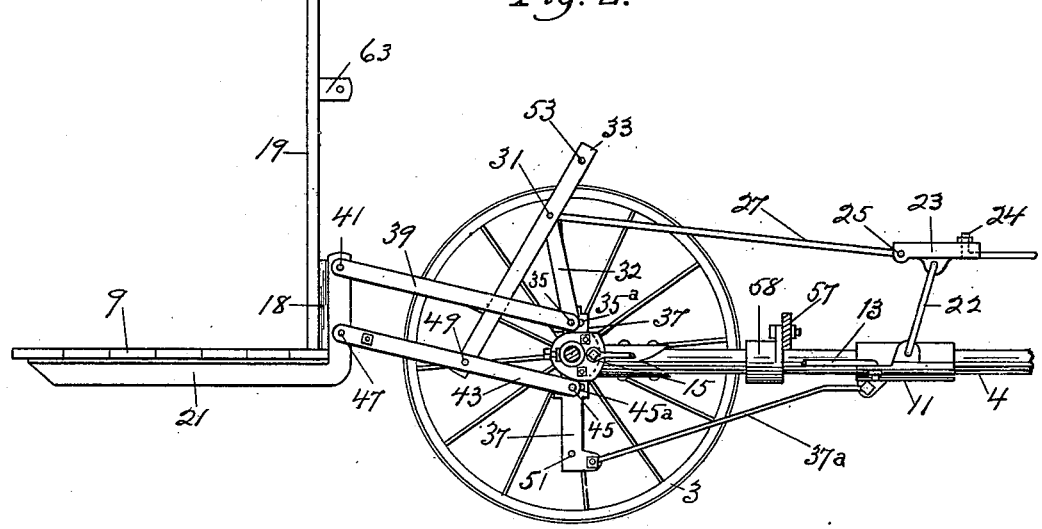
Figure 4:
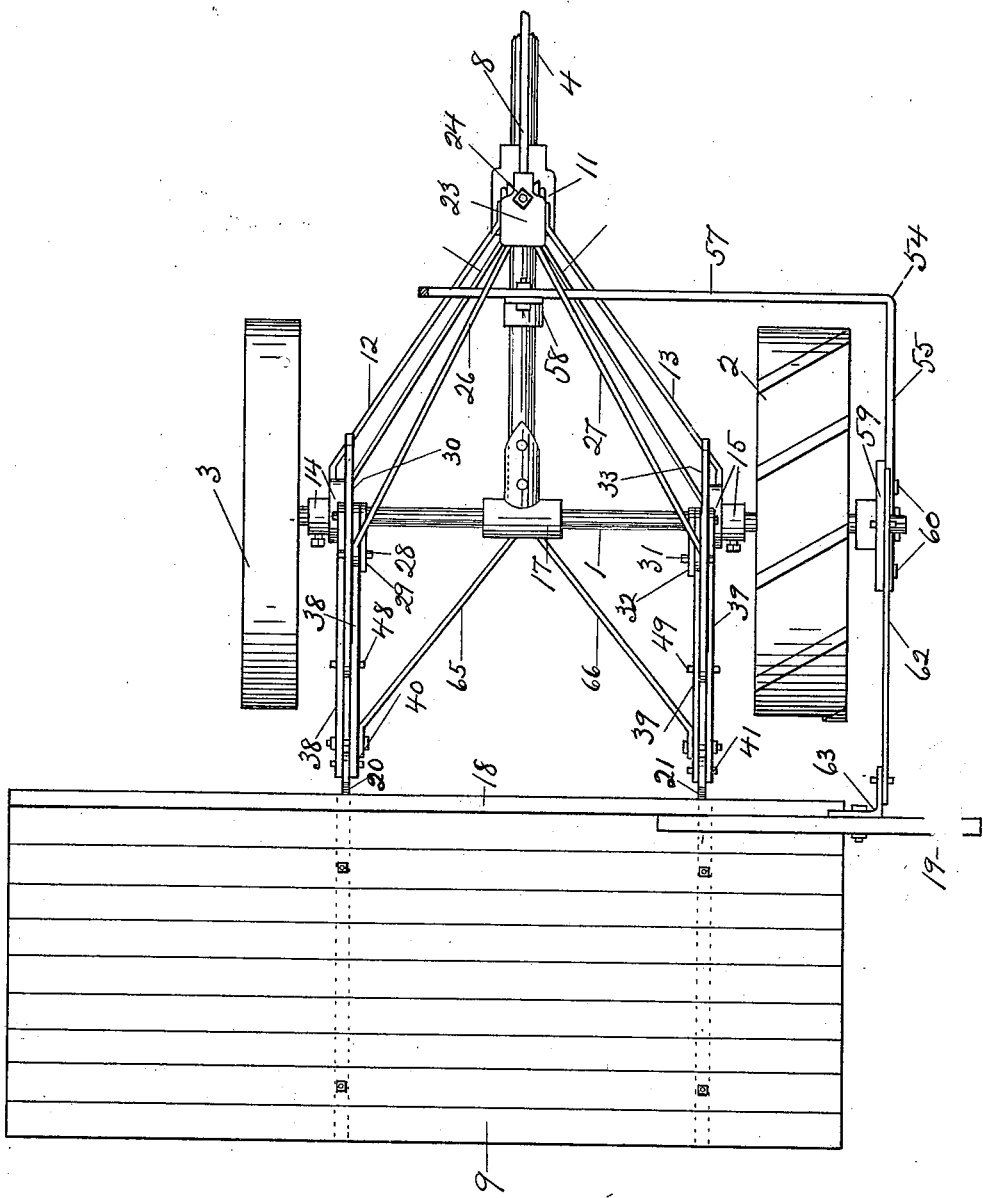

In the drawings, Figure 1 is a perspective side view of a harvester with the main drive-wheel removed, showing the parts involved in my invention. Fig. 2 is a side elevation of a portion of my device looking across the machine from the left-hand side, showing the system of levers, links, &c., involved in my invention located on the right-hand side of the machine, the intervening corresponding parts which are on the left-hand side, also the left-hand wheel, being removed for greater clearness, certain parts being shown in section and the adjustable platform in end elevation and in lowered position. Fig. 3 is a side elevation of a portion of my device looking across the machine from the left-hand side, showing the system of levers, &c., involved in my invention located on the left-hand side of the machine, the corresponding parts which are upon the right-hand side, also the left-hand wheel, being omitted for greater clearness, certain parts being shown in section and the adjustable platform in end elevation and in raised position. Fig. 4 is a top plan view. Fig. 5 is a perspective view of a system of braces connecting the tongue and axle with parts herein described.

1 designates the main axle, upon which the machine is carried; 2 and 3, the drive-wheels; 4, the rearwardly-extending tongue; 5, the driver's stand; 6, the tiller-wheel; 7, the lever and catch for operating the main pull-rod 8, which actuates the mechanism for elevating and lowering the platform 9; and 10 the notched segment for engaging said catch. Upon the tongue 4 is fixed a saddle 11, from which extend braces 12 13 to the axle upon each side, where they are secured to clips 14 15, mounted on the axle. A brace 16 extends from the saddle 11 and engages a downward-projecting arm $17^a$, Fig. 5, which depends from a tongue-hound 17, connecting the tongue 4 with the axle 1.

The platform 9 is of the ordinary character, carrying the sickle at its front edge and provided with the usual canvas and other customary appendages. (Not shown.)

18 designates the backboard of the platform; 19, the rear elevator side, secured at its lower end to said backboard, and 20 21 the metallic brackets on which the platform and its appendages are supported. Said brackets are of right-angular form, having horizontal portions which extend under the platform to its front edge and vertical portions against which the backboard rests.

On the saddle 11 is pivoted a fork or link 22, also pivoted at its upper end to a block 23, to which the main pull-rod 8 is connected at 24. To the forward end of said block are pivotally connected at 25 right and left pull-rods 26 27, the former extending to a pivotal connection at 28 with a brace-link 29 and a cross-link 30 above the axle on the right side of the machine and the latter to a similar connection at 31 with a brace-link 32 and cross-link 33 on the left side of the machine. Said brace-links are pivoted at their lower ends at 34 and 35, respectively, to the upper ends of flat brackets 36 37, which are secured to the clips 14 15, mounted on the axle 1. Said brackets 36 37 have downward extensions depending below the axle which are braced to the saddle 11 by braces $36^a$ $37^a$ and to the tongue-hound 17 by braces $36^b$ $37^b$. To the upper ends of each of said brackets 36 37 in one adjustment of the elevating device on the common pivots 34 35 with said brace-links 29 32 are pivoted platform-links 38 39, which last-mentioned links are pivoted at their outer ends at 40 41, respectively, to the upper ends of the vertical portions of the platform-brackets 20 21. Said links 38 39 are duplicated on each side of said brackets 20 21 and 36 37, as shown in Figs. 1 and 4. Platform-levers 42 43 are also pivoted to said brackets 36 37 at points 44 45 below the axle 1, and the outer ends of said levers are pivoted to the platform-brackets 20 21 at points 46 47 below the pivots 40 41. Said platform-levers 42 43 are substantially parallel with the platform-links 38 39 and are also duplicated on each side of the brackets 20 21 and brackets 36 37. The cross-links 30 33 upon each side of the machine extend from the pivots 28 31 downwardly, passing between the doubled platform-links 38 39 and the doubled platform-levers 42 43, to the latter of which they are pivoted at 48 and 49, respectively.

It is obvious from the connection of the parts described that tension upon the main pull-rod 8 will elevate the platform 9 from the position shown in Figs. 1 and 2 to that shown in Fig. 3 or any intermediate point; also, that links 38 39 and levers 42 43 being parallel, respectively, to each other and the pivots connecting them at one end with the platform-brackets 20 21 and at the other end with the axle-brackets 36 37 being in the same vertical plane the platform will be kept at the same inclination to the ground whether in high or low position. Provision is also made for varying the adjustment of the system of levers, links, &c., described, so that the platform may be carried at a higher or lower level, according to the character of the work to be done. To this end the depending brackets 36 37 and also the cross-links 30 33 are provided with a plurality of pivot-holes, so that, for example, the inner ends of levers 42 43 may be shifted to pivot-holes 50 51 and the inner ends of links 38 39 shifted to pivot-holes 44 45. In such case the cross-links 30 33 would also be lowered and the pivotal connection between pull-rods 26 27, brace-links 29 32, and said cross-rods be made through pivot-holes 52 53 on said cross-rods instead of at 28 31, as shown.

With the construction as thus far described the platform has been supposed to and would remain in a substantially-horizontal plane whether in high or low position. Provision is, however, made for changing the inclination of the platform in such a manner that it will retain such inclination whether in high or low position until the adjustment is changed. This is accomplished by providing a plurality of pivot-holes, preferably three, arranged in a horizontal line in brackets 36 37, both above and below the axle 1. In the drawings the connections of the platform-links 38 39 and brace-links 29 32 are shown as made at 34 35. If, however, it is desired to tilt the platform upward, the connection of links 38 39 and brace-links 29 32 may be transferred from pivots 34 35 to $34^a$ $35^a$. On the other hand, if it is desired to give the platform a downward inclination, the described pivotal connection may be transferred from 34 35 to pivot-holes in the brackets 36 37 to the left of 34 35. (Indicated by dotted lines in Figs. 2 and 3, also by full lines in Fig. 5.) A similar series of pivot-holes, arranged horizontally, is provided in each of the brackets 36 37 below the axle, two of which, $44^a$ and $45^a$, are shown in Figs. 2 and 3, so that when the links 38 39 are adjusted below the axle, as hereinbefore described, the same variations in the inclination of the platform may be effected. I also provide novel means of bracing the rear elevator side 19 according to the degree of elevation and inclination of the platform 9.

54 designates a right-angular plate having a front portion 55, mounted longitudinally of the machine in boxing 56 on the axle outside the main drive-wheel 2, and a rear portion 57, extending transversely in rear of said wheel and secured to a clip 58 on the tongue. A vertical standard 59 is secured to said plate by bolts 60 at points near the axle. Said standard is provided with a plurality of holes 61 at different levels and in different vertical planes to receive bolts pivotally connecting said standard with a cross-brace 62, which is in turn pivotally connected to an ear or lug 63 on the rear elevator side 19. The elevator being carried up and down with the platform it is necessary and possible by changing the positions of said bolts to vary the adjustment of said brace to correspond with the adjustment of the platform whether in high or low position and at any degree of inclination. A brace 64, extending from the standard 59 to plate 54, helps preserve the rigidity of the parts. As shown in Figs. 4 and 5, braces 65 66 also extend from the arm $17^a$, depending from tongue-hound 17, to the platform-levers 42 43 to prevent lateral movement of the platform. Said braces have two adjustments on the arm $17^a$, corresponding to the high and low positions of the platform.

The operation of the device has been substantially indicated in the foregoing description. When the driver in the course of the work wishes to change the degree of elevation of the platform according to the varying nature of the ground passed over or other circumstances, he effects his object by the proper manipulation of lever 7. These changes may be made instantaneously. When, however, the character of the work to be done requires that the platform shall be carried at a certain average height or at a particular inclination continuously during the performance of such work, the proper pivotal connections of the cross-links, levers, brackets, &c., are made as herein described.

Having described my invention, I claim as new and desire to secure by Letters Patent—

1. In a harvester, a platform elevating and lowering device, comprising brackets on which the platform is carried, an adjustable operating-lever, right and left pull-rods connected with said lever, vertically-disposed right and left brackets supported on the axle, brace-links pivoted at their upper ends to said pull-rods and at their lower ends to said axle-brackets, platform-levers, pivoted at their inner ends to said axle-brackets and at their outer ends to said platform-brackets, cross-links pivoted at their upper ends to said brace-links and at their lower ends to said platform-levers, and platform-links, parallel with said platform-levers, and pivoted at their inner ends to said axle-brackets and at their outer ends to said platform-brackets, substantially as set forth.

2. In a harvester provided with a grain-receiving platform, carried in front of the machine, and an elevator mounted at one end of said platform, the combination, with means of elevating and lowering said platform, of a substantially right-angular plate, having a front portion, supported on the outer end of the axle adjacent to said elevator, and a rear portion extending transversely of the machine and secured on the tongue, a vertical standard secured to the front portion of said plate and extending above the axle, and a brace pivotally connected at its inner end to said standard, and at its outer end to said elevator, substantially as set forth.

3. In a harvester, a platform elevating and lowering device, comprising brackets on which the platform is carried, an adjustable operating-lever, right and left pull-rods connected with said lever, vertically-disposed right and left brackets supported on the axle, brace-links pivoted at their upper ends to said pull-rods and at their lower ends to said axle-brackets, platform-levers, pivoted at their inner ends to said axle-brackets and at their outer ends to said platform-brackets, cross-links pivoted at their upper ends to said brace-links and at their lower ends to said platform-levers, and platform-links, parallel with said platform-levers, and pivoted at their inner ends to said axle-brackets and at their outer ends to said platform-brackets, said axle-brackets being provided with a plurality of pivot-holes, in different horizontal planes, for varying the adjustment of said platform-links and platform-levers, to carry the platform at different elevations, substantially as set forth.

4. In a harvester, a platform elevating and lowering device, comprising brackets on which the platform is carried, an adjustable operating-lever, right and left pull-rods connected with said lever, vertically-disposed right and left brackets supported on the axle, brace-links pivoted at their upper ends to said pull-rods and at their lower ends to said axle-brackets, platform-levers, pivoted at their inner ends to said axle-brackets and at their outer ends to said platform-brackets, cross-links pivoted at their upper ends to said brace-links and at their lower ends to said platform-levers, and platform-links, parallel with said platform-levers, and pivoted at their inner ends to said axle-brackets and at their outer ends to said platform-brackets, said axle-brackets being provided with a plurality of pivot-holes, in different vertical planes, for varying the adjustment of said platform-links, to carry the platform at different inclinations, substantially as set forth.

In testimony whereof I affix my signature in the presence of two witnesses.

JAMES DUDLEY VANHOOK McWILLIAMS.

Witnesses:
M. F. NELSON,
W. W. LEMMON.